United States Patent [19]

Okamoto

[11] 4,388,036
[45] Jun. 14, 1983

[54] TOY CAR AND ROADBED UNIT

[75] Inventor: Shozo Okamoto, Tokyo, Japan

[73] Assignee: Yonezawa Toys Co., Ltd., Tokyo, Japan

[21] Appl. No.: 210,157

[22] Filed: Nov. 25, 1980

[30] Foreign Application Priority Data

| Nov. 28, 1979 | [JP] | Japan | 54-153901 |
| Nov. 28, 1979 | [JP] | Japan | 54-153902 |
| Nov. 28, 1979 | [JP] | Japan | 54-153903 |
| Nov. 28, 1979 | [JP] | Japan | 54-153904 |

[51] Int. Cl.³ .......................... B60P 3/06; B60L 15/32
[52] U.S. Cl. ...................................... 414/537; 46/259;
46/262; 104/302; 104/305; 238/10 F
[58] Field of Search ........................ 104/295, 302–305,
104/288, 301; 46/257–259, 262; 414/537;
238/10 F; 273/86 B

[56] References Cited

U.S. PATENT DOCUMENTS

| 3,201,899 | 8/1965 | Toteff et al. | 46/258 |
| 3,239,962 | 3/1966 | Toteff et al. | 46/258 |
| 3,239,963 | 3/1966 | Smith et al. | 104/305 X |
| 3,308,576 | 3/1967 | Nadolny | 104/305 X |
| 3,384,030 | 5/1968 | Goldfarb | 104/305 X |
| 3,586,328 | 6/1971 | Kazel | 46/257 X |
| 3,797,404 | 3/1974 | Barlow et al. | 104/304 |

*Primary Examiner*—Randolph Reese
*Attorney, Agent, or Firm*—Murray Schaffer

[57] ABSTRACT

A toy car and roadbed unit which comprises a roadbed on which there is provided at least one electric track including three conductive paths which are connected to a positive output terminal, a negative output terminal and a center tap of the DC power source respectively and not less than two toy cars which run along two electric tracks each comprising three conductive paths in which the conductive path connected to the center tap is commonly used.

9 Claims, 5 Drawing Figures

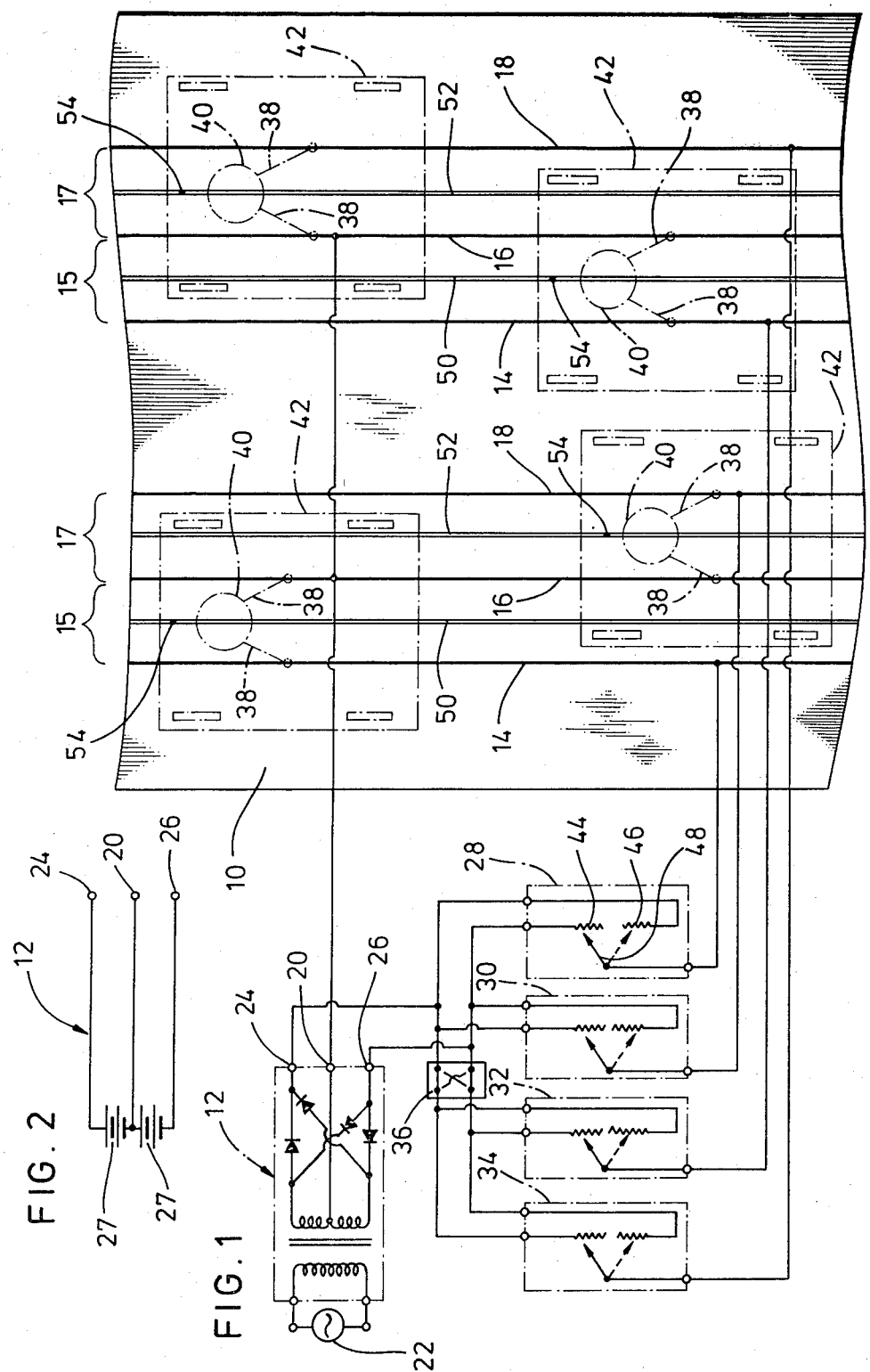

TOY CAR AND ROADBED UNIT

BACKGROUND OF THE INVENTION

This invention is concerned with a toy car and roadbed unit.

Hitherto, there has been provided a toy car playing unit in which two or more cars run on a roadbed normally having four electric paths which are connected to the positive output terminal and the negative output terminal of the DC power source respectively. The two cars running along each electric path are controlled individually. In this conventional toy car unit, however, the addition of more toy cars to be played naturally requires more electric paths resulting in an enlargement of the roadbed at a greater cost.

It is, therefore, a general object of the present invention to provide a toy car and roadbed unit of more simplified electric arrangement and construction.

SUMMARY OF THE INVENTION

According to the present invention, a novel toy car and roadbed unit is provided in which three terminals of a single DC source, namely the positive output, negative output and center tap are connected to three conductive paths arranged on the roadbed to provide two electric paths or tracks having a common center tap. Two cars are thus able to run along the three conductive paths at the same time. The power circuit and the construction of the toy car playing unit is thereby simplified.

In accordance with the invention, three conductive paths are arranged on a roadbed. Each conductive path is connected to a single DC power source. Two toy cars are placed on the two electric tracks formed by the three conductive paths in which one conductive path is commonly used, so that two toy cars may be controlled separately.

Thus, a principal object of the invention is to provide a toy car and roadbed unit which comprises a roadbed on which at least two electric tracks are formed, each including three conductive paths provided with a DC power circuit having a center tap in common with the other. A toy car having a DC motor is driven by collecting the current from either of two conductive tracks. Two toy cars may run, one on each of the two electric tracks formed by the three conductive paths.

The DC power source preferably comprises at least two batteries connected in series with a center contact derived from a center tap. Further, the DC power source may comprise a single phase full-wave rectifying circuit having a center tap which is connected to a single phase AC power source.

The three condutive paths are arranged in parallel with uniform spacing in which the center conductive path is connected to the center tap of the DC power source.

The two electric tracks of three conductive paths may preferably each be provided with a toy car guide for guiding the toy car.

The car guides are channels extended between two adjacent conductive paths. Guide pins provided on the bottom surface of the car enter into the channels. Alternatively, the car guide may be of a guide wall or a guide path adapted to control the advancing direction of the toy car.

Further, the DC power circuit is connected with change-over switches which change the individual polarities of the conductive paths from the positive output terminal and the negative output terminal of the DC power source. This switch is provided with a variable resistor to increase a circuit resistance when the contacts are changed over.

The DC power circuit is further connected with a polarity change-over switch to change polarities of the conductive paths simultaneously.

The toy car is provided with collectors which make contact with two adjacent conductive paths.

In a particular embodiment according to the invention, the toy car which runs along the electric track formed on the roadbed comprises a parent toy car having a car body which extends over two electric tracks but runs along only one electric track. The body of the parent car is provided with two auxiliary conductive paths which are made into contact with two conductive paths on the roadbed, thus forming another electric path. A baby toy car adapted to ride up and down the parent car is provided and runs along the auxiliary conductive paths provided on the parent car.

The roadbed may comprise two or more separate segments which are conveniently interconnected to provide the desired electric path.

Other objects and advantages of the invention will be more fully described with reference to the accompanying drawings illustrative of preferred embodiments of the invention in which:

BRIEF DESCRIPTION OF THE INVENTION

FIG. 1 is a diagram of the electric power circuit connected with the roadbed in accordance with the present invention;

FIG. 2 is a circuit diagram illustrative of the electric power circuit of another embodiment of the present invention;

DESCRIPTION OF THE INVENTION

Figure 3:
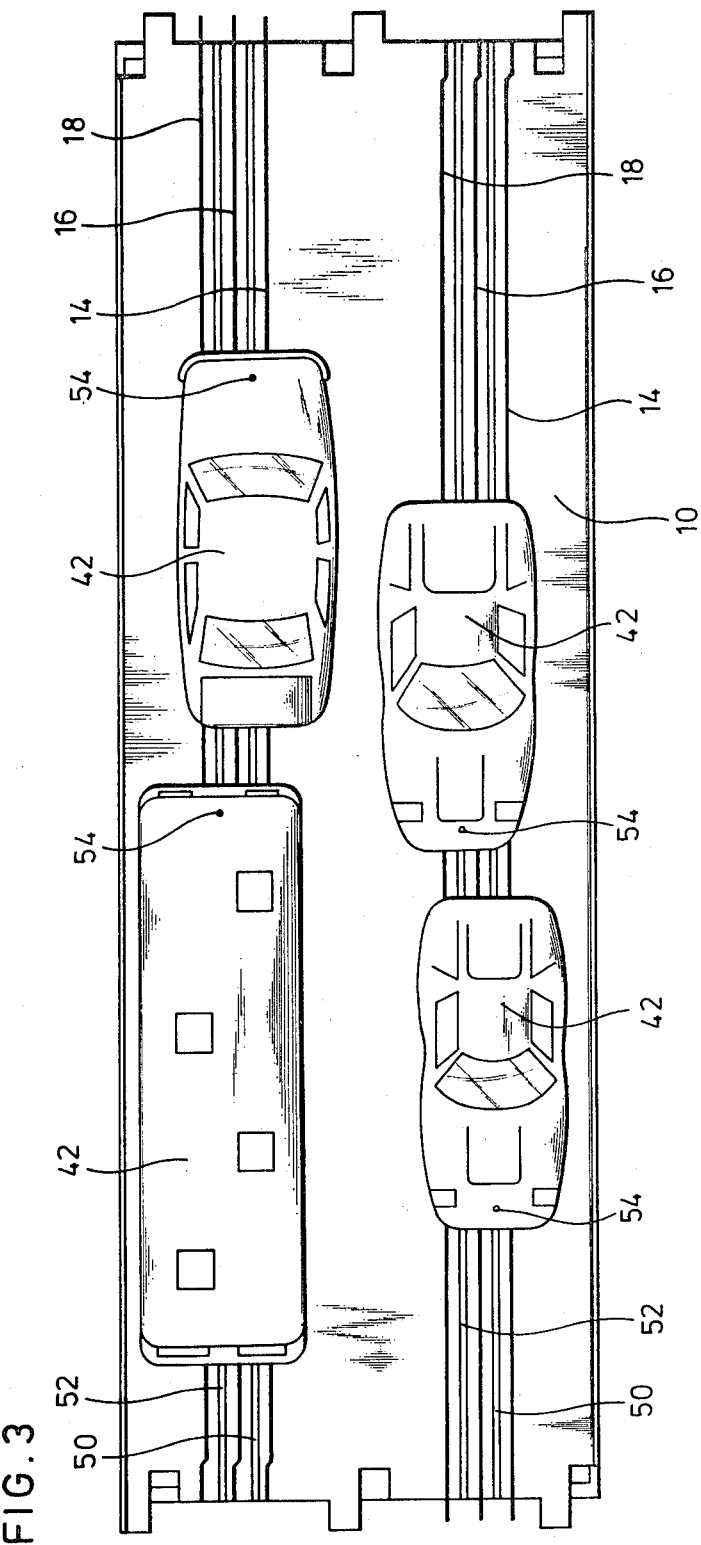
FIG. 3 is a plan view of toy cars arranged on the roadbed according to the invention.

In FIG. 1, the reference numeral 10 represents a roadbed and 12 denotes a DC power circuit. The roadbed 10 is made of a hard plastic material. On the roadbed 10 are arranged two sets of electric tracks 15 and 17, each formed of conductive paths 14, 16 and 18 suitably spaced. The conductive path 16 provides a common path as hereinafter fully described.

The DC electric power circuit 12 is comprised of a single phase full-wave rectifying circuit connected to a single phase AC power source 22 to derive a fully rectified output. The rectifying circuit has a center tap 20, a positive terminal 24 and a negative terminal 26. Alternatively, the DC power circuit 12 may be comprised of a plurality of batteries 27 connected in series, from which the center contact of these batteries 27 there is taken a center tap 20 to provide the desired power circuit.

The toy car and roadbed according to the invention is particularly characterized in that the three output terminals 20, 24 and 26 of the DC power circuit 12 are connected to three conductive paths 14, 16 and 18 provided on the roadbed 10.

In the embodiment as shown in FIG. 1, the center tap terminal 20 of the DC power circuit 12 is connected to the center conductive path 16 and the positive output terminal 24 and the negative output terminal 26 of the DC power circuit 12 are connected to the conductive paths 14 and 18. The positive output terminal 24 and the negative output terminal 26 are individually connected to the corresponding conductive paths 14 and 18 through polarity change-over switches 28, 30, 32 and 34. Further, provision may be made providing a polarity change-over switch 36 for changing all polarities of one set of the conductive paths simultaneously.

As hereinbefore described, the output terminals of the DC power circuit 12 are connected to the conductive paths 14, 16 and 18 to selectively hold those paths in a negative potential, an intermediate (zero) potential and a positive potential. Accordingly, it will be appreciated that two electric tracks are provided from each set of conductive paths; each including the conductive paths 14 and 16 on one hand and the conductive paths 16 and 18 on the other hand with the conductive path 16 being common to both. Thus, four electric tracks may be provided on the roadbed.

A toy car 42 is provided with a DC motor 40 and is provided with collectors 38, 38 which make contact with the conductive paths 14, 16 or 16 and 18 so that the DC power is supplied to the DC motor 40.

According to the circuit arrangement as illustrated in FIG. 1, two toy cars 42, 42 run along the conductive paths of one set in the same direction. When one of the polarity change-over switches 28 to 34 is changed to reverse the polarity of the conductive path connected to the changed switch, the running direction of the particular toy car 42 on the associated conductive paths is reversed accordingly. An abrupt change of the polarity imparts a shock to the toy car with likelihood of dislodging the car or disturbing further running of the toy car. To avoid this, the polarity change-over switches 28 to 34 may be provided with variable resistors 44 and 46, so that the circuit resistance when the contact 48 is changed is increased to thereby decrease the speed of the toy car 42. Moreover, the polarities of the other set of conductive paths are reversed simultaneously by the polarity switch 36, so that two toy cars 42 may run along two sets of conductive paths toward opposite directions as shown in FIG. 3.

Figure 4:
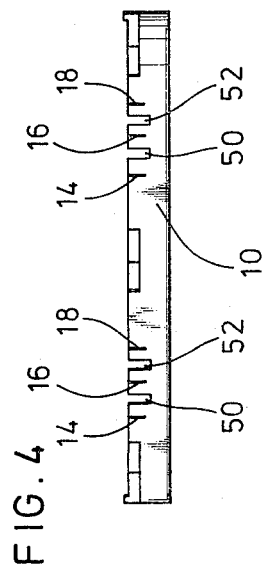
FIG. 4 is a lateral end view of the roadbed according to the invention.

According to the invention, the roadbed 10 is required to provide a convenient toy car guide for exact and smooth running of the toy car along the conductive paths of one set. To ensure this purpose, guide channels 50 and 52 are provided between the conductive paths 14 and 16 and the conductive paths 16 and 18 as shown in FIG. 4. The guide channels 50 and 52 receive guide pins 54 provided on the bottom surface of the toy car 42. Alternatively, the guide channels 50 and 52 may be replaced by a guide wall or guide path provided along the electric tracks to ensure smooth running of the toy car 42.

In another embodiment of the invention, the roadbed 10 may be comprised of not less than two segments which are conveniently connected together to provide an electric track of closed loop or straight way.

Figure 5:
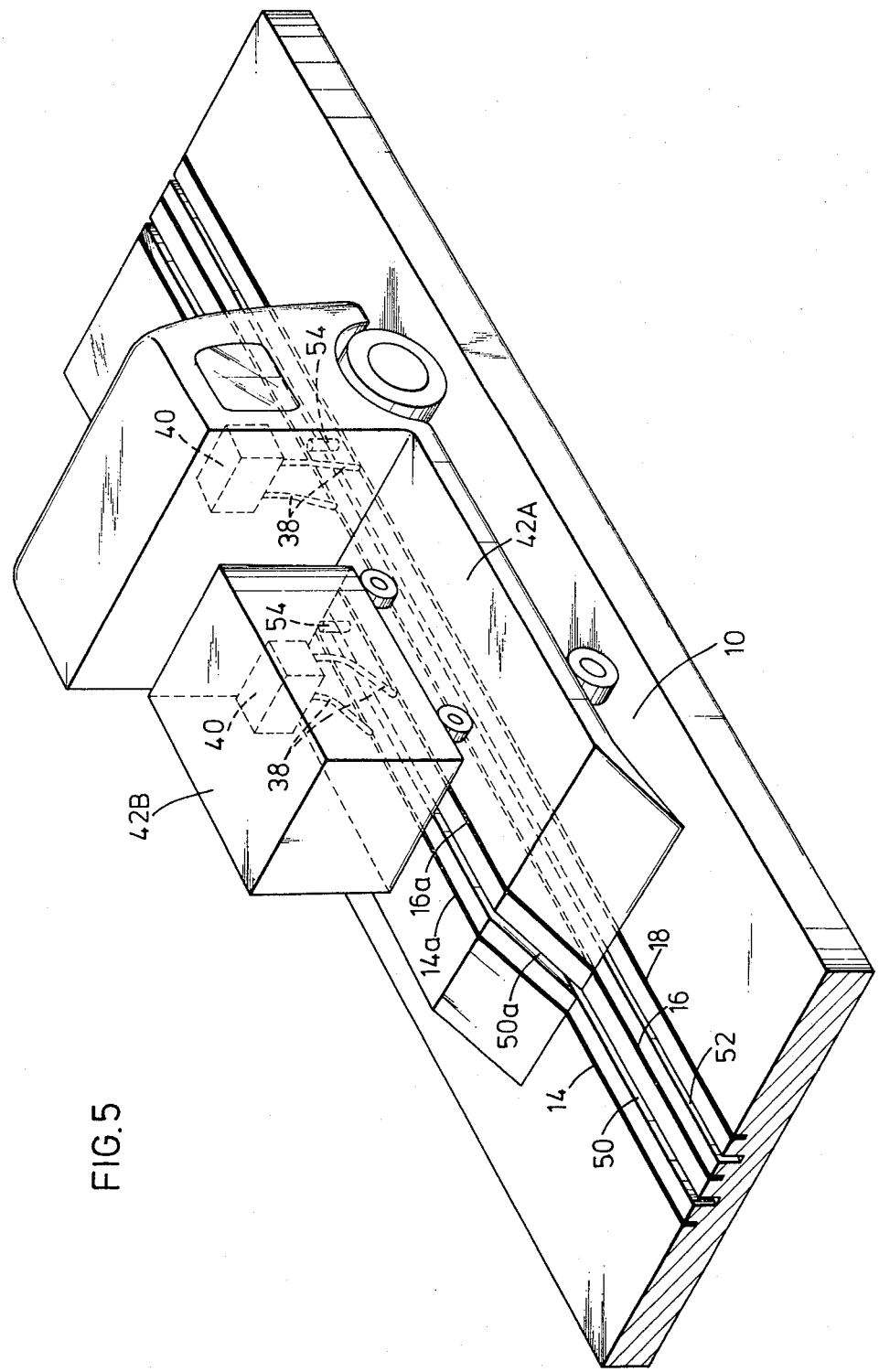
FIG. 5 is a perspective view of the toy car of another embodiment arranged on the roadbed according to the invention.

In a further embodiment of the invention as shown in FIG. 5, the toy car is comprised of a parent toy car 42A having a DC motor 40 with collectors 38, 38 which make contact with the corresponding conductive paths 16 and 18 or 14 and 16 and a separate baby toy car 42B. The parent toy car 42A has a body which extends over all conductive paths in the set and on the body thereof there are provided auxiliary conductive paths 14a and 16a on which the baby toy car 42B rests. A guide channel 50a is provided which is aligned with the guide channel 50. The auxiliary conductive paths 14a and 16a make contact with the conductive paths 14 and 16 to provide continuous electric paths.

As hereinbefore fully described, one set of three conductive paths may provide two electric tracks and thus more tracks may be provided on the restricted roadbed as compared with the conventional roadbed. Further, a single power circuit may energize many conductive paths with simplification of the circuit arrangement with reduction of the cost for manufacture.

Moreover, the polarity of each electric track may be simply changed to reverse the running direction of the toy car with convenient contact of the travelling speed of the toy car, thereby to provide more interest in play.

Without further elaboration, the foregoing will also fully illustrate the invention that others may, be applying the current or future knowledge, readily adapt the same for use under various conditions of service. For example, the electric track may be provided with a convenient turnout to avoid undesired clash or conflict of two toy cars when travelling along the same electric tracks.

I claim:

1. A toy car and road bed unit comprising a road bed having at least one set of three conductive paths running in parallel uniform-spaced relationship to each other, a guide channel located between the center one of the conductive paths and each of the other conductive paths, a DC power source having a center terminal connected to the center one of the conductive paths and a positive and negative terminal selectively connected to each of the other conductive paths, to form two tracks having the center conductive path in common, at least one toy car, each car having collector means depending therefrom and spaced for contact with the center conductive path and one of said other conductive paths and a pin adapted to enter into said channel associated with said track.

2. The unit according to claim 1 wherein said selective connection comprises a switching circuit enabling the positive and negative terminal to be selectively connected to one or the other of said other conductive paths.

3. The unit as claimed in claim 2, wherein said switching circuit comprises change-over switches which change the individual polarities of the conductive paths connected to the positive output terminal and the negative output terminal of the DC power source.

4. The unit as claimed in claim 3, wherein each of said switches is provided with a variable resistor to increase a circuit resistance when the contacts are changed over.

5. The unit as claimed in claim 3, wherein said switching circuit is provided with a polarity change-over switch to change polarities of the conductive paths simultaneously.

6. The unit as claimed in claim 1, wherein the DC power source comprises at least two batteries connected in series from the center contact of which is derived the center terminal.

7. The unit as claimed in claim 1, wherein the DC power source comprises a single phase full-wave rectifying circuit connected to a single phase AC power source.

8. The unit as claimed in any one of claims 1 to 5 wherein the toy car adapted to run on the road bed comprises a parent toy car having a car body which extends over two electric tracks and having collectors for running along only one electric track, said parent toy car being provided on the body with two auxiliary conductive paths forming an auxiliary track and a baby toy car removable from the parent car adapted to run on the auxiliary track.

9. The unit as claimed in claim 1, wherein the roadbed comprises two or more separate segments which are conveniently interconnected to provide the desired electric path.

* * * * *